United States Patent
Kato et al.

(10) Patent No.: US 7,131,337 B2
(45) Date of Patent: Nov. 7, 2006

(54) PRESSURE SENSOR AND METHOD FOR MANUFACTURING PRESSURE SENSOR

(75) Inventors: Satoshi Kato, Musashino (JP); Toshiyuki Saruya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 10/988,506

(22) Filed: Nov. 16, 2004

(65) Prior Publication Data

US 2005/0172723 A1     Aug. 11, 2005

(30) Foreign Application Priority Data

Feb. 5, 2004   (JP)   ............................. 2004-028853

(51) Int. Cl.
*G01L 9/00*   (2006.01)
(52) U.S. Cl. .................................................... 73/754
(58) Field of Classification Search ................... 73/754, 73/715, 727; 364/508
See application file for complete search history.

(56) References Cited

U.S. PATENT DOCUMENTS 5,186,055 A *   2/1993   Kovacich et al. .............. 73/727

6,782,755 B1 *   8/2004   Tai et al. ....................... 73/754
6,973,836 B1 *   12/2005   Katsumata et al. ........... 73/754

FOREIGN PATENT DOCUMENTS

| JP | 5-50335 | 7/1993 |
|---|---|---|
| JP | 2656566 | 5/1997 |

* cited by examiner

*Primary Examiner*—Jewel V. Thompson
(74) *Attorney, Agent, or Firm*—Westerman, Hattori, Daniels & Adrian, LLP.

(57) ABSTRACT

An inexpensive and simple pressure sensor having good static pressure characteristics is provided. In a pressure sensor including a base having a hole to which a pressure is applied and performing electrical and mechanical insulation, and a sensor having a diaphragm connected to the hole and a strain gauge for converting a strain occurring in the diaphragm to an electric signal, the sensor being mounted to the base, the base is formed with such a thickness that the strain at the time of applying a static pressure does not change.

13 Claims, 3 Drawing Sheets

PRESSURE SENSOR AND METHOD FOR MANUFACTURING PRESSURE SENSOR

BACKGROUND OF THE INVENTION

1. Field of the Invention

This invention relates to a pressure sensor and particularly to an inexpensive and simple pressure sensor having good static pressure characteristics.

2. Description of the Related Art

A conventional pressure sensor has a silicon base 9 and a boss 10 (see, for example, JP-UM-A-5-50335). The conventional pressure sensor will now be described in detail with reference to FIG. 1. FIG. 1 is a sectional view of the conventional pressure sensor.

In FIG. 1, a metal 5, which is a metal base, has a hole 6 to which a pressure is applied. Also a glass 4, which is a base, has the hole 6 to which a pressure is applied. The glass 4 and the metal 5 are mounted to each other by Au eutectic bond or the like. The glass 4 performs electrical and mechanical insulation.

Also, the silicon base 9 has the hole 6 to which a pressure is applied. The silicon base 9 and the glass 4 are mounted to each other. The boss 10 is provided between the silicon base 9 and the glass 4.

A silicon sensor 1, which is a sensor, has a diaphragm 2 connected to the hole 6. The silicon sensor 1 has a strain gauge 3 for converting a strain (displacement) occurring in the diaphragm 2 to an electric signal. One side of the silicon sensor 1 is mounted to the silicon base 9.

The other side of the silicon sensor 1 contacts a room B. The hole 6 and the diaphragm 2 form a room A.

A static pressure is applied to the silicon sensor 1, the silicon base 9, the glass 4 and the other parts in the conventional example of FIG. 1.

In the conventional example of FIG. 1 constructed as described above, the pressure applied to the hole 6 is converted to an electric signal. The strain gauge 3 in the conventional example of FIG. 1 generates an electric signal based on the differential pressure between the room A and the room B and the static pressure.

When the static pressure is applied, the silicon sensor 1, the silicon base 9 and the glass 4 are deformed, respectively. Since the silicon sensor 1 and the silicon base 9 have a large Young's modulus, these are deformed slightly. Since the glass 4 has a small Young's modulus, it is deformed largely.

The silicon base 9 and the boss 10 in the conventional example of FIG. 1 restrain transfer of the influence of deformation of the glass 4 to the strain gauge 3 of the silicon sensor 1. The boss 10 reduces the bond area between the silicon base 9 and the glass 4.

Moreover, some conventional pressure sensors (semiconductor pressure converting apparatus) separately have a structure for detecting a differential pressure and a structure for detecting a static pressure, and also have a structure for reducing interference with a differential pressure signal while increasing output of a static pressure signal (see, for example, Japanese Patent No. 2,656,566).

However, the conventional example of FIG. 1 has a problem that an error occurs in the application of the static pressure (static pressure characteristics).

Specifically, since the Young's modulus of silicon is different from the Young's modulus of glass, when the static pressure is applied, the deformation of the silicon sensor 1 and the silicon base 9 differs from the deformation of the glass 4, and a strain based on the deformation of the glass is generated in the strain gauge 3.

Moreover, since the glass 4 has characteristics such as delayed elasticity and viscoelasticity, it causes a strain in the diaphragm 2 and thus causes a strain in the strain gauge 3. This causes an error in the conventional example of FIG. 1.

Also, the silicon base 9 and the boss 10 in the conventional example of FIG. 1 have problems of increase in the number of components, increase in the number of processing steps, and high cost.

Moreover, the formation of the boss 10 has a problem of deteriorating the yield of bond. The formation of the boss 10 also has a problem of lowering broken pressure reduce the bond area.

Meanwhile, the conventional example of Japanese Patent No. 2,656,566 has a problem that it does not restrain occurrence of an error in the static pressure characteristics and cannot acquire good static pressure characteristics.

SUMMARY OF THE INVENTION

It is an object of this invention to solve the above-described problems and provide an inexpensive and simple pressure sensor having good static pressure characteristics.

DETAILED DESCRIPTION OF THE PREFERRED EMBODIMENTS

Figure 1:
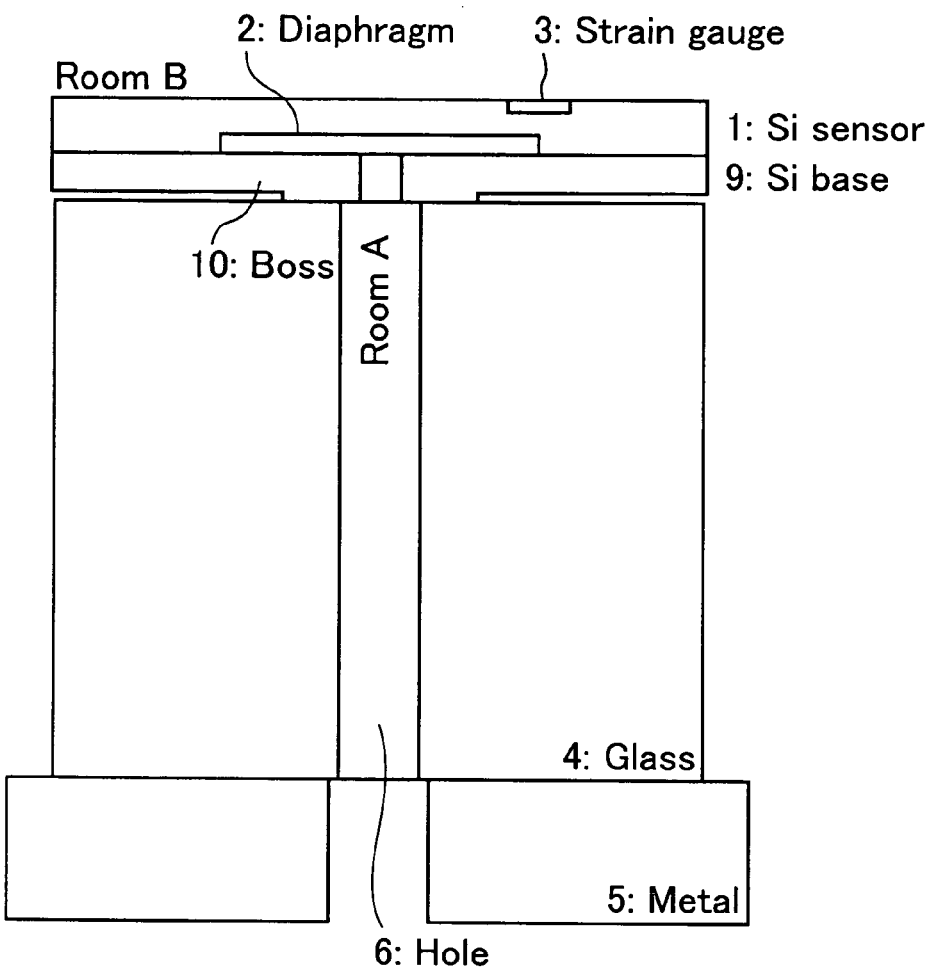
FIG. 1 is a sectional view of a conventional pressure sensor.
Figure 2:
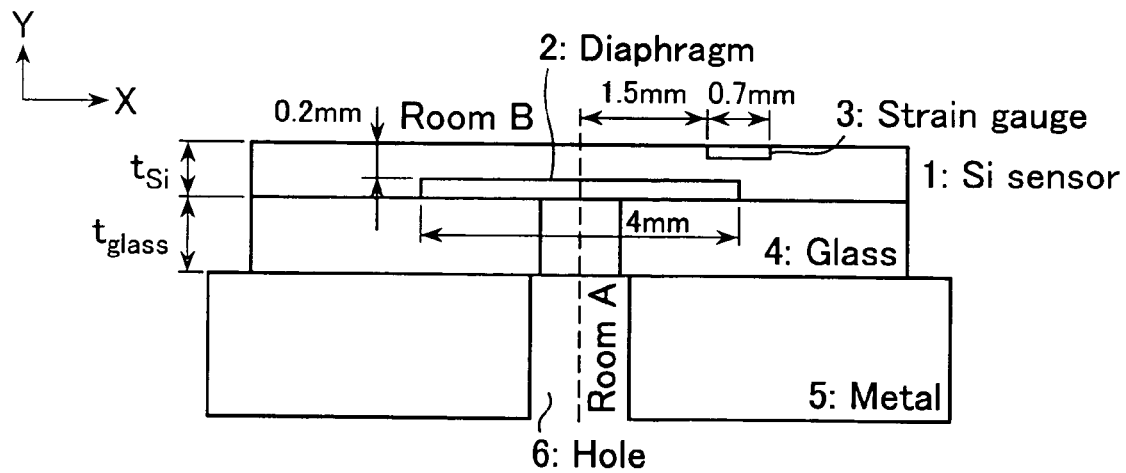
FIG. 2 is a sectional view of an embodiment of this invention.

Hereinafter, this invention will be described in detail with reference to FIG. 2. FIG. 2 is a sectional view of an embodiment of this invention. The same elements as those in the conventional example of FIG. 1 are denoted by the same numerals.

The embodiment of FIG. 2 is characterized by the thickness $t_{glass}$ of a glass 4, which is a base.

In FIG. 2, a metal 5, which is a metal base, has a hole 6 to which a pressure is applied. Also the glass 4, which is a base, has the hole 6 to which a pressure is applied. The glass 4 and the metal 5 are mounted to each other, for example, by Au eutectic bond or the like. The glass 4 performs electrical and mechanical insulation.

A silicon sensor 1, which is a sensor, has a diaphragm 2 connected to the hole 6. The silicon sensor 1 has a strain gauge 3 for converting displacement of the diaphragm 2 to an electric signal. The silicon sensor 1 and the glass 4 are mounted to each other, for example, by anodic bond or the like.

The glass 4 has a thickness $t_{glass}$ and the silicon sensor 1 has a thickness $t_{Si}$. The thickness $t_{glass}$ of the glass 4 is a thickness such that a strain occurring in the strain gauge 3 at the time of applying a static pressure does not change.

Specifically, the thickness $t_{glass}$ of the glass 4 is of a value satisfying the following equation (1):

$$E_{glass} \cdot t_{glass} \approx E_{Si} \cdot t_{Si} \quad (1)$$

The strain gauge 3 is formed at a position shifted in a direction x from the center of the diaphragm 2, as shown in FIG. 2.

In the embodiment of FIG. 2 constructed as described above, the pressure applied to the hole 6 is converted to an electric signal, as in the conventional example of FIG. 1. The strain gauge 3 in the embodiment of FIG. 2 generates an electric signal based on the differential pressure and static pressure, like the strain gauge 3 in the conventional example of FIG. 1.

Figure 3:
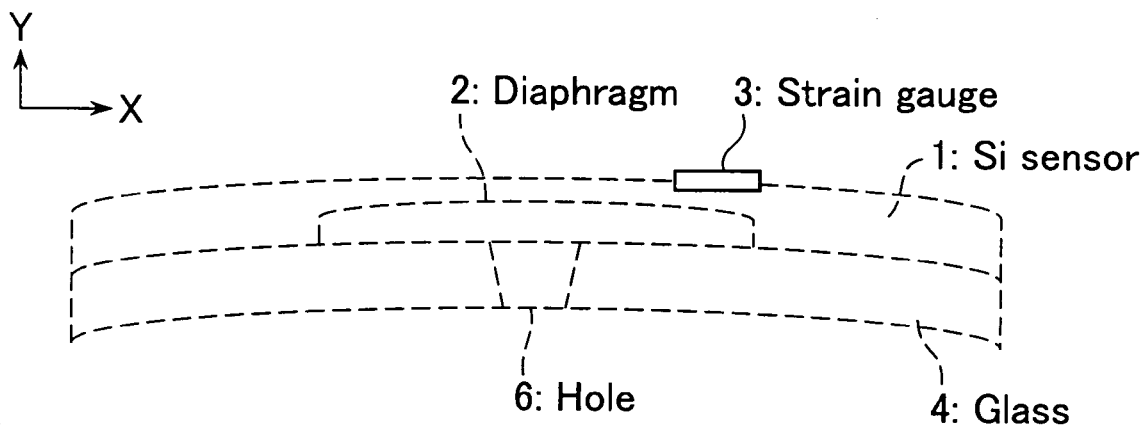
FIG. 3 is a sectional view at the time of applying a static pressure in the embodiment of FIG. 2.

First, characteristics at the time of applying a static pressure in the embodiment of FIG. 2 will be described in detail with reference to FIG. 3. FIG. 3 is a sectional view at the time of applying a static pressure in the embodiment of FIG. 2. The shape in the sectional view of FIG. 3 is shown exaggeratedly. The description of the metal 5 is not given here.

In a structure formed by eliminating the glass 4 from the embodiment of FIGS. 2 and 3 (having only the silicon sensor and the strain gauge), the silicon sensor 1 is deformed by the static pressure in such a direction that its volume decreases. In this case, a strain $-\epsilon_{Si}$ in the direction x occurs in the strain gauge 3. The strain $-\epsilon_{Si}$ is equivalent to a strain occurring in the diaphragm of the silicon sensor that is not mounted to the glass 4.

On the other hand, in a structure formed by eliminating the silicon sensor 1 from the embodiment of FIGS. 2 and 3 (having only the glass and the strain gauge), the glass 4 is deformed by the static pressure in such a direction that its volume decreases. Since the glass has a smaller Young's modulus than the silicon, the glass is deformed more largely. In this case, a strain $-\Delta\epsilon_{glass1}$ in the direction x occurs in the strain gauge 3.

In the embodiment of FIGS. 2 and 3, the silicon sensor 1 and the glass 4 warp and deform in a convex shape as shown in FIG. 3. Then, a tensile strain $\Delta\epsilon_{glass2}$ in the direction x based on this convex deformation occurs in the strain gauge 3.

Therefore, in the strain gauge 3 in the embodiment of FIGS. 2 and 3, the strain $-\epsilon_{Si}$, the strain $-\Delta\epsilon_{glass1}$ and the strain $\Delta\epsilon_{glass2}$ occur. That is, in the strain gauge 3 in the embodiment of FIGS. 2 and 3, a strain $(-\epsilon_{Si}-\Delta\epsilon_{glass1}+\Delta\epsilon_{glass2})$ occurs.

When the thickness $t_{glass}$ of the glass 4 is large, the force applied to the glass 4 increases and therefore the absolute value of the strain $-\Delta\epsilon_{glass1}$ increases. Also, since the convex deformation decreases, the absolute value of the tensile strain $\Delta\epsilon_{glass2}$ decreases.

On the other hand, when the thickness $t_{glass}$ is small, the force applied to the glass 4 decreases and therefore the absolute value of the strain $-\Delta\epsilon_{glass1}$ decreases. Also, since the convex deformation increases, the absolute value of the tensile strain $\Delta\epsilon_{glass2}$ increases.

Therefore, when the thickness $t_{glass}$ of the glass 4 is of a predetermined value, the strain $-\Delta\epsilon_{glass1}$ based on the deformation of the glass 4 and the tensile strain $\Delta\epsilon_{glass2}$ based on the convex deformation, which occur in the strain gauge 3, are balanced and offset with each other.

Thus, in this case, only the strain $-\epsilon_{Si}$ occurs in the strain gauge 3 in the embodiment of FIGS. 2 and 3. That is, the strain $(-\epsilon_{Si}-\Delta\epsilon_{glass1}+\Delta\epsilon_{glass2})$ generated by the static pressure in the embodiment of FIGS. 2 and 3 is equal to the strain $-\epsilon_{Si}$ generated by the static pressure in the structure formed by eliminating the glass from the embodiment of FIGS. 2 and 3.

As can be understood from the above description, in the embodiment of FIG. 2, no error occurs when the static pressure is applied.

A method for manufacturing such a structure in the embodiment FIG. 2 will now be described.

First, apart from the embodiment of FIG. 2, a step of forming the structure of the embodiment of FIG. 2 from which the glass 4 has been eliminated is carried out.

Second, a step of comparing the strain $(-\epsilon_{Si}-\Delta\epsilon_{glass1}+\Delta\epsilon_{glass2})$ occurring in the strain gauge 3 in the embodiment of FIG. 2 with the strain $-\epsilon_{Si}$ occurring in the strain gauge 3 in the structure of the embodiment of FIG. 2 from which the glass 4 has been eliminated is carried out.

When the strain $(-Si-\Delta\epsilon_{glass1}+\Delta\epsilon_{glass2})$ is different from the strain $-\epsilon_{Si}$, the thickness $t_{glass}$ of the glass 4 is changed.

When the strain $(-\epsilon_{Si}-\Delta\epsilon_{glass1}\alpha\Delta\epsilon_{glass2})$ is larger than the strain $-\epsilon_{Si}$, the thickness $t_{glass}$ of the glass 4 is increased. When the strain $(-\epsilon_{Si}-\Delta\epsilon_{glass1}+\Delta\epsilon_{glass2})$ is smaller than the strain $-\epsilon_{Si}$, the thickness $t_{glass}$ of the glass 4 is decreased.

Figure 4:
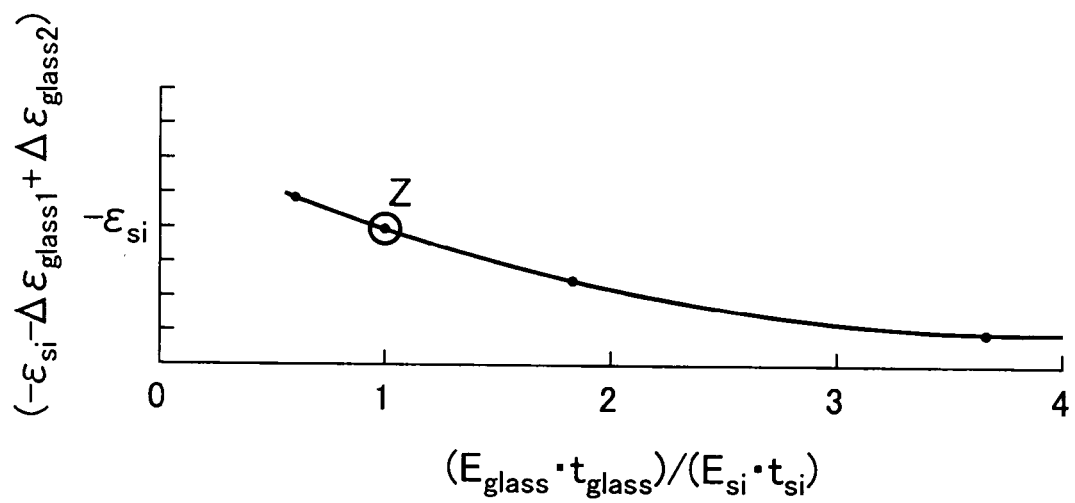
FIG. 4 is a graph showing strain ($-\epsilon_{Si}-\Delta\epsilon_{glass1}+\Delta\epsilon_{glass2}$) with respect to ($E_{glass} \cdot t_{glass}$)/($E_{Si} \cdot t_{Si}$) in the embodiment of FIG. 2.

Next, the characteristics at the time of applying the static pressure in the embodiment of FIG. 2 will be described again in detail with reference to FIG. 4. FIG. 4 is a graph showing the strain $(-\epsilon_{Si}-\Delta\epsilon_{glass1}+\Delta\epsilon_{glass2})$ occurring in the strain gauge 3 with respect to $(E_{glass} \cdot t_{glass})/(E_{Si} \cdot t_{Si})$ in the embodiment of FIG. 2. As a parameter, the thickness $t_{glass}$ of the glass 4 is used. FIG. 4 shows the result of calculation with FEM.

In FIG. 4, when $(E_{glass} \cdot t_{glass})(E_{Si} \cdot t_{Si})$ increases, the strain decreases. When $(E_{glass} \cdot t_{glass})/(E_{Si} \cdot t_{Si})$ is approximately 1, that is, at a point Z in FIG. 4, the value of the strain $(-\epsilon_{Si}-\Delta\epsilon_{glass1}+\Delta\epsilon_{glass2})$ is equal to $-\epsilon_{Si}$.

That is, it is newly found that when the thickness $t_{glass}$ of the glass 4 is small, not only the strain $(-\epsilon_{Si}-\Delta\epsilon_{glass1}+\Delta\epsilon_{glass2})$ decreases but also the value of the strain $(-\epsilon_{Si}-\Delta\epsilon_{glass1}+\Delta\epsilon_{glass2})$ is equal to $-\epsilon_{Si}$. Therefore, in the embodiment of FIG. 2 having the glass 4 with such a thickness $t_{glass}$ that the strain $(-\epsilon_{Si}-\Delta\epsilon_{glass1}+\Delta\epsilon_{glass2})$ is equal to $-\epsilon_{Si}$, preferable characteristics are provided. As the thickness $t_{glass}$ of the glass 4 is further reduced, the strain $(-\epsilon_{Si}-\Delta\epsilon_{glass1}+\Delta\epsilon_{glass2})$ increases.

Also, in the embodiment of FIG. 2, since the bond area between the silicon sensor 1 and the glass 4 is large, high broken pressure and stable characteristics can be achieved.

Moreover, in the embodiment of FIG. 2, a small number of components are used. In the embodiment of FIG. 2, the shape of the structure is simple and the processing step is simplified. Thus, low cost is achieved in the embodiment of FIG. 2.

Moreover, in the embodiment of FIG. 2, not only preferable static pressure characteristics but also preferable temperature characteristics are achieved.

Figure 5:
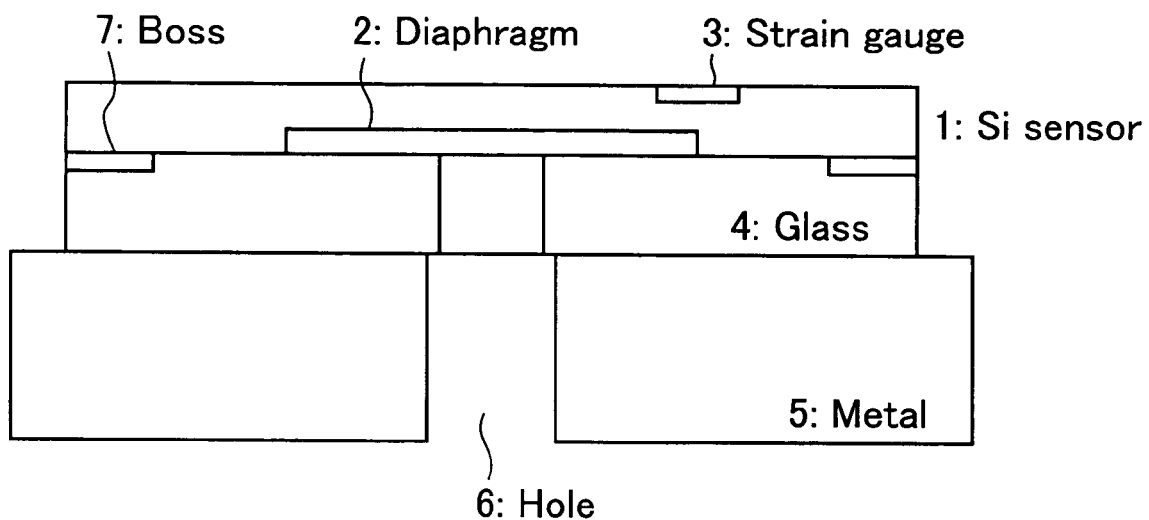
FIG. 5 is a sectional view of another embodiment.

FIG. 5 is a sectional view of another embodiment of this invention. The same elements as those in the embodiment of FIG. 2 are denoted by the same numerals and will not be described further in detail.

The embodiment of FIG. 5 is characterized by a boss 7.

In FIG. 5, the boss 7 is formed between a glass 4 and a silicon sensor 1. The boss 7 reduces the bond area between the glass 4 and the silicon sensor 1.

The thickness $t_{glass}$ of the glass 4 in the embodiment of FIG. 5 is a thickness such that a strain occurring in a strain gauge 3 at the time of applying a static pressure does not change, as in the case of the embodiment of FIG. 2.

In the embodiment of FIG. 5 constructed as described above, when the thickness $t_{glass}$ of the glass 4 is of a predetermined value, stress occurring in the strain gauge 3 at the time of applying the static pressure is cancelled and therefore no error occurs, as in the embodiment of FIG. 2.

Moreover, the boss 7 restrains transfer of deformation of the glass 4 to the silicon sensor 1. Such an effect of the boss 7 is compatible with a deformation balancing effect of the thickness $t_{glass}$ of the glass 4. Therefore, in the embodiment of FIG. 5, more preferable characteristics can be achieved.

Since the boss 7 in the embodiment of FIG. 5 can be made smaller than the boss 10 in the conventional example of FIG. 1, the yield of bond and the broken pressure are improved in the embodiment of FIG. 5, compared with the conventional example of FIG. 1.

Figure 6:
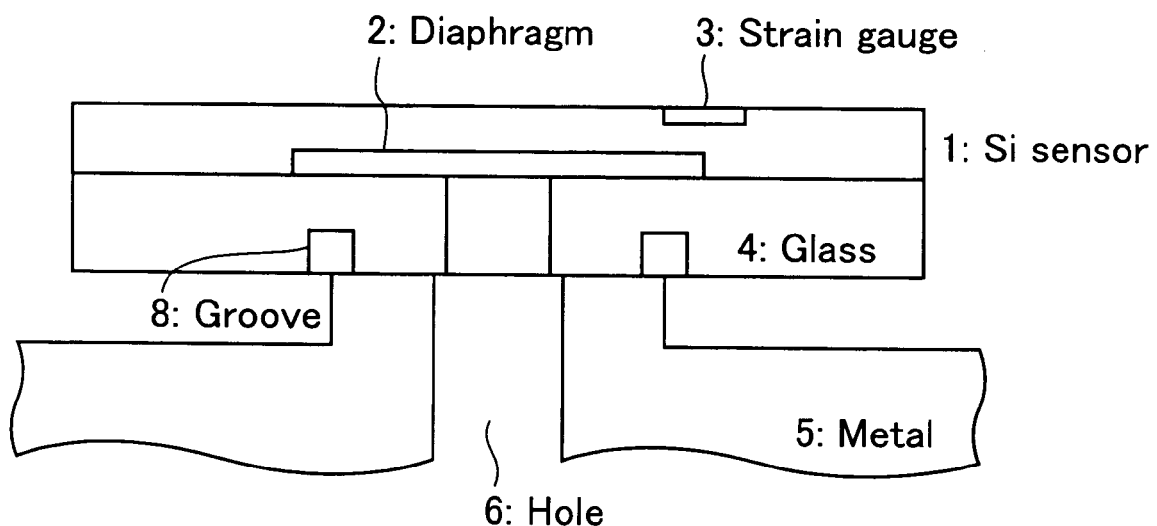
FIG. 6 is a sectional view of another embodiment.

FIG. 6 is a sectional view of another embodiment of this invention. The same elements as those in the embodiment of FIG. 2 are denoted by the same numerals and will not be described further in detail.

The embodiment of FIG. 6 is characterized by a metal 5 and a groove 8.

In FIG. 6, the groove 8 is formed between a glass 4 and the metal 5. The groove 8 reduces the bond area between the glass 4 and the metal 5.

The thickness $t_{glass}$ of the glass 4 in the embodiment of FIG. 6 is a thickness such that a strain occurring in a strain gauge 3 at the time of applying a static pressure does not change, as in the case of the embodiment of FIG. 2.

In the embodiment of FIG. 6 constructed as described above, when the thickness $t_{glass}$ of the glass 4 is of a predetermined value, stress occurring in the strain gauge 3 at the time of applying the static pressure is cancelled and therefore no error occurs, as in the embodiment of FIG. 2.

Moreover, the groove 8 restrains transfer of deformation of the metal 5 to the silicon sensor 1. Such an effect of the groove 8 is compatible with a deformation balancing effect of the thickness $t_{glass}$ of the glass 4. Therefore, in the embodiment of FIG. 6, more preferable characteristics can be achieved.

Also, in the embodiment of FIG. 6, if the thickness $t_{glass}$ of the glass 4 is adjusted in consideration of the deformation of the metal 5, the deformation of the silicon sensor 1, the deformation of the glass 4 and the deformation of the metal can be balanced. In the embodiment of FIG. 6 as described above, not only the influence of the deformation of the silicon sensor 1 and the influence of the deformation of the glass 4 but also the influence of the deformation of the metal 5 can be cancelled, and therefore more preferable characteristics can be achieved.

In the above-described embodiments, the sensor is made of silicon and the base is made of glass. However, similar effects and advantages can be achieved by forming the sensor made of other materials than silicon and forming the base made of other materials than glass.

As can be understood from the above description, this invention is not limited to the above-described embodiments and includes various changes and modifications without departing from the scope of the invention.

This invention has the following effects.

According to this invention, a pressure sensor having good static pressure characteristics can be provided. Also, an inexpensive pressure sensor can be provided. Moreover, a simple pressure sensor can be provided.

What is claimed is:

1. A pressure sensor comprising:
    a base having a hole to which a pressure is applied and performing electrical and mechanical insulation;
    a metal base mounted to the base and having a hole, the hole of the metal base being aligned with the hole of the base;
    a groove formed between the base and the metal base; and
    a sensor having a diaphragm connected to the hole and a strain gauge for converting a strain occurring in the diaphragm to an electric signal, the sensor being mounted to the base;
    wherein the base is formed with such a thickness that the strain at the time of applying a static pressure does not change; and
    wherein the base is made of glass.

2. The pressure sensor as claimed in claim 1, wherein the sensor is made of silicon.

3. The pressure sensor as claimed in claim 2, comprising a boss formed between the base and the sensor.

4. A pressure sensor comprising:
    a base having a hole to which a pressure is applied and performing electrical and mechanical insulation; and
    a sensor having a diaphragm connected to the hole and a strain gauge for converting a strain occurring in the diaphragm to an electric signal, the sensor being mounted to the base;
    wherein modulus of elasticity $E_{glass}$ of the base, thickness $t_{glass}$ of the base, modulus of elasticity $E_{Si}$ of the sensor, and thickness $t_{Si}$ of the sensor substantially satisfy the following equation:

$$E_{glass} \cdot t_{glass} \approx E_{Si} \cdot t_{Si}.$$

5. The pressure sensor as claimed in claim 4, wherein the sensor is made of silicon.

6. The pressure sensor as claimed in claim 5, wherein the base is made of glass.

7. The pressure sensor as claimed in claim 6, comprising a boss formed between the base and the sensor.

8. The pressure sensor as claimed in claim 6, comprising a metal base mounted to the base and having a hole, the hole of the metal base being aligned with the hole of the base; and a groove formed between the base and the metal base.

9. A pressure sensor comprising:
    a base having a hole to which a pressure is applied and performing electrical and mechanical insulation; and
    a sensor having a diaphragm connected to the hole and a strain gauge for converting a strain occurring in the diaphragm to an electric signal, the sensor being mounted to the base;
    wherein thickness of the base is formed so that the strain $-\Delta\epsilon_{glass1}$ based on the deformation of the base and the tensile strain $\Delta\epsilon_{glass2}$ based on the convex deformation, which occur in the strain gauge, are balanced and offset with each other.

10. The pressure sensor as claimed in claim 9, wherein the sensor is made of silicon.

11. The pressure sensor as claimed in claim 10, wherein the base is made of glass.

12. The pressure sensor as claimed in claim 11, comprising a boss formed between the base and the sensor.

13. The pressure sensor as claimed in claim 11, comprising a metal base mounted to the base and having a hole, the hole of the metal base being aligned with the hole of the base; and a groove formed between the base and the metal base.

* * * * *